United States Patent
Schubert et al.

(10) Patent No.: US 6,344,229 B2
(45) Date of Patent: Feb. 5, 2002

(54) METHOD FOR DESTROYING HARMFUL MICROORGANISMS IN LIQUIDS BY SHORT-TIME HIGH TEMPERATURE HEATING

(75) Inventors: Klaus Schubert, Karlsruhe; Maximilian Fichtner, Oftersheim, both of (DE)

(73) Assignee: Forschungszentrum Karlsruche GmbH, Karlsruche (DE)

( * ) Notice: Subject to any disclaimer, the term of this patent is extended or adjusted under 35 U.S.C. 154(b) by 0 days.

(21) Appl. No.: 09/906,006

(22) Filed: Jul. 12, 2001

Related U.S. Application Data

(63) Continuation-in-part of application No. PCT/EP00/02087, filed on Mar. 10, 2000.

(30) Foreign Application Priority Data

Mar. 19, 1999 (DE) .......................... 199 12 541

(51) Int. Cl.[7] .................. A23L 3/00; A23C 3/00
(52) U.S. Cl. .................. 426/521; 422/1; 426/522
(58) Field of Search .................. 426/520, 521, 426/522, 524; 422/1

(56) References Cited

U.S. PATENT DOCUMENTS

| | | | |
|---|---|---|---|
| 4,975,246 A | 12/1990 | Charm | 426/521 |
| 4,997,662 A * | 3/1991 | Lidman et al. | 426/522 |
| 5,152,060 A | 10/1992 | Schubert et al. | 29/33 B |
| 5,443,857 A * | 8/1995 | Arph et al. | 426/522 |
| 5,976,592 A * | 11/1999 | Polato | 426/522 |

FOREIGN PATENT DOCUMENTS

| | | |
|---|---|---|
| DE | 44 08 073 | 9/1995 |
| DE | 195 21 256 | 12/1996 |
| DE | 196 08 824 | 9/1997 |
| DE | 197 38 926 | 3/1999 |
| EP | 0 722 075 | 7/1996 |

OTHER PUBLICATIONS

F. Dannenberg, "Application of Reaction Kinetics to the Denaturation of Whey Proteins in Heated Milk", Milchwissenschaft, vol. 43, No. 1, 1988, pp. 3–7.

* cited by examiner

*Primary Examiner*—George C. Yeung
(74) *Attorney, Agent, or Firm*—Klaus J. Bach

(57) ABSTRACT

In a method of destroying harmful microorganisms in liquids by short term high temperature heating of the liquids in micro heat exchangers formed by stacks of metal foils having parallel microchannels, in a first step, the liquid is rapidly heated in a micro heat exchanger with a gradient of at least 200° K/sec, then is maintained at the high temperature for a time period of <2 sec and is finally cooled again in a micro heat exchanger with a gradient of at least 200° K/sec.

4 Claims, 1 Drawing Sheet

Fig. 1
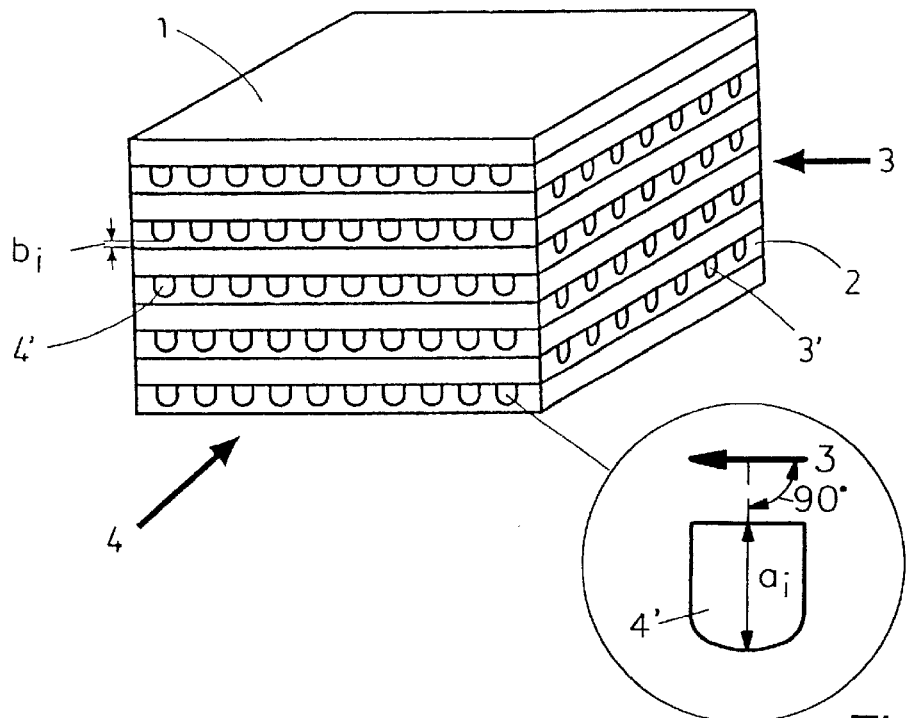
Fig. 1a
Fig. 2
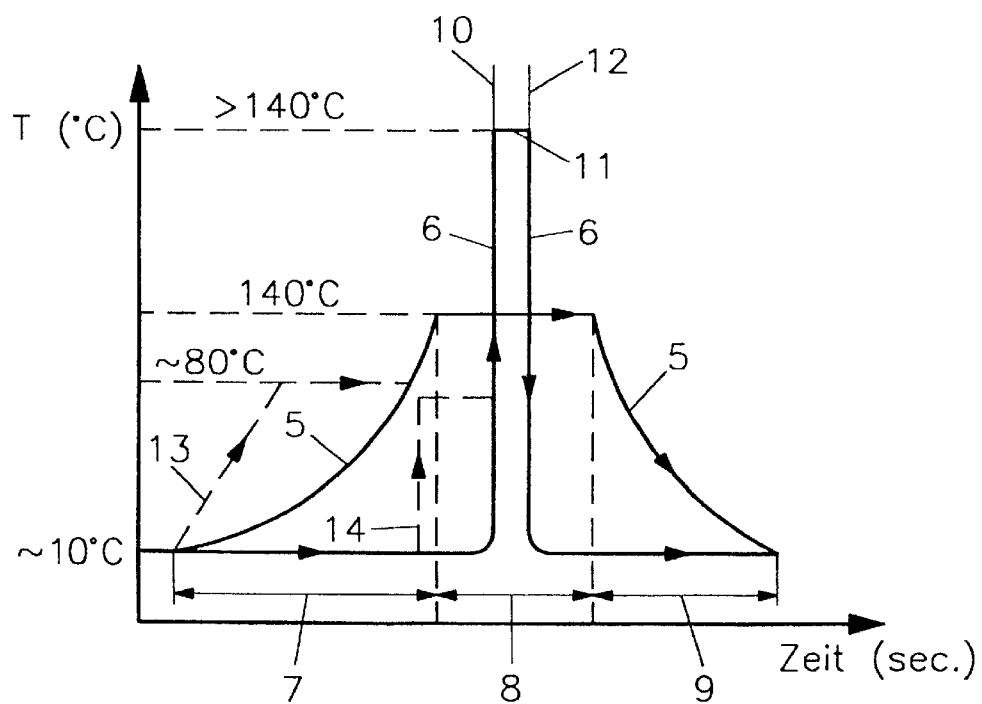

US 6,344,229 B2

METHOD FOR DESTROYING HARMFUL MICROORGANISMS IN LIQUIDS BY SHORT-TIME HIGH TEMPERATURE HEATING

This is a Continuation-In-Part application of international application PCT/EP00/02087 filed Mar. 10, 2000 and claiming the priority of German application 199 12 541.4 filed Mar. 19, 1999.

BACKGROUND OF THE INVENTION

The invention relates to a method of destroying harmful microorganisms in liquids by short-time heating of the liquid in a micro heat exchanger for example by ultra high heating of liquid foods such as milk or other liquids in three steps wherein the liquid is first heated to a high temperature then maintained at this temperature for a predetermined period and is then again cooled down.

It has been common practice to destroy harmful microorganisms in liquids, particularly in liquid foods, by a heat treatment such as pasteurization, ultra-pasteurization or similar processes. Such treatment results in an improved quality and in an increased preservation time. Specifically, in these processes, the liquid, for example milk, is first heated and then kept at a relatively high temperature for a certain time and is then cooled. For this purpose, steam injection is used, but also conventional tube or plate heat exchangers are used, which results in very different residence times for fractions of the products in the heat exchanger. There may be low flow speeds in the heat exchanger particularly in the vicinity of the walls so that the product may be subject to heat damages. The heating times and cooling times as well as the temperatures achieved will be discussed later on the basis of FIG. 2. In laboratory research, capillary tubes have also already been used for the heating of the liquid which capillary tubes had a diameter of 1 to 3 mm. However, for heating relatively large amounts of liquid in an industrial process, such capillary tubes are not suitable.

EP-A-0722075 discloses a tube heat exchanger, which is used for the sterilization of liquids contaminated with microorganisms. In this heat exchanger all tubes through which the liquid is conducted as well as the supply and the discharge passages in the heat exchanger have an identical length and an identical cross-section such that the residence times of the liquid in the tubes of the heat exchanger remains in narrow limits. The tubes are heated by a liquid, by steam or a gaseous heating medium, which is conducted through the heat exchanger by way of two nozzles. By a particular design of the cross-sections, the dimensions, and the arrangement of the tubes in the housing, the efficiency of the tube heat exchanger can be substantially increased so that the liquid can be heated in the tubes to 140° C. within a few tenth of a second. With several such tube heat exchangers arranged in series, a three stage heat treatment of liquids with a heating stage, a residence stage and a cooling stage can be provided. In order to further increase the efficiency, it is recommended to use the individual heat exchangers without intermediate supply and discharge channels. It is also pointed out that a number of heat exchangers could be used which are arranged in parallel flow circuits for increasing the flow volume of the liquid.

It is the object of the present invention to provide a method for destroying harmful microorganisms in liquids particularly liquid foods, such as milk, using a heat exchanger arrangement which, by its design, permits rapid heating of the liquid without steam injection and again rapid cooling of the liquid so that the liquid can be maintained at a temperature of over 140° C. for only a predetermined short period so as to preserve the food values contained in the liquid.

SUMMARY OF THE INVENTION

In a method of destroying harmful microorganisms in liquids by short term high-temperature heating of the liquids in micro heat exchangers formed by stacks of metal foils having parallel microchannels, in a first step, the liquid is rapidly heated in a micro heat exchanger with a gradient of at least 200° K/sec, then is maintained at the high temperature for a time period of less than 2 sec and is finally cooled down, again in a micro heat exchanger, with a gradient of at least 200° K/sec.

The invention will become more readily apparent from the following description of a preferred embodiment thereof described below on the basis of the accompanying drawings.

BRIEF DESCRIPTION OF THE DRAWINGS

FIG. 1 shows, in principle, the design of a micro heat exchanger, and

FIG. 1a is an enlarged view of a micro-channel,

FIG. 2 shows the temperature curve of the liquid obtained with the method according to the invention as compared with state of the art methods.

DESCRIPTION OF AN EMBODIMENT OF THE INVENTION

FIG. 1 shows in principle the design of a micro heat exchanger 1 for explaining its operation. It consists of a stack of diffusion-welded metal foils 2 with a foil thickness of, for example, 100 μm. Using cutting tools which have been ground to a desired shape, parallel micro-channels 4' for the passage of fluid (arrow 4) to be heated are cut into the metal foils 2. Parallel micro-channels 3' for the passage of a cooling fluid 3 are cut into the adjacent foils of the stack of metal foils 2, which microchannels 3' extend in a direction normal to that of the microchannels 4'. The obtainable minimum channel dimensions are in the area of the 10 μm.

The geometric shape of the microchannels 3' and 4' is freely selectable. Rectangular cross-sections as well as partially circular cross-sections may be provided. The microchannels 3' and 4' may have different dimensions and different shapes.

In order to obtain equal flow volumes in the various microchannels of a fluid passage, the microchannels of such a passage or identical. The characteristic hydraulic channel diameter of the microchannels of the fluid passage; (passage 3' or 4') is determined by the following relationship:

$$D_i = 4A_i/U_i,$$

wherein
$D_i$=the characteristic hydraulic diameter of the channels of the fluid passage i,
$A_i$=the flow cross-section of the channel of the passage;
$U_i$=the wetted channel circumference of the passage;
i=the index for the fluid passage.

FIG. 1 shows a section of a microchannel 4' of the fluid passage 4 with the channel dimensions $a_i$, wherein $a_i$ is the largest dimension of the microchannel 4' normal to the flow direction of the cooling medium 3.

FIG. 1 also shows the smallest wall thickness $b_i$ of a metal foil 2 that is the smallest distance between the two fluid passages 3 and 4.

Micro heat exchangers are generally characterized in that either the characteristic hydraulic channel diameter $d_i$ (here: i=3 and 4) or the channel dimensions $a_i$ of all the microchannels of at least one fluid passage are smaller than 1000 $\mu$m. The smallest wall thickness $b_i$ between the individual fluid passages should also be smaller than 1000 $\mu$m, preferably smaller than 200 $\mu$m. This also applies if the microchannels of a fluid passage 1 having different flow cross-sections.

In the embodiment as shown in FIG. 1, the metal foils 2 are so stacked on one another in such a way that the microchannels 3' and 4' of adjacent fluid passages extend at an angle of 90° with respect to one another (cross-flow micro heat exchanger) and that they are sealed with respect to one another in a helium-tight manner. Besides the cross-flow arrangement, other flow arrangement such as parallel-or counter-current flow arrangements or combinations thereof could be utilized. The high heat transfer performance in a micro heat exchanger is based on the fact that, because of the small hydraulic channel diameter $d_i$, and particularly the small channel dimension $a_i$, the travel distance for the heat in the fluid flowing though the channels is very small. In comparison with a coefficient of heat transmission of about 1000 W/K m in conventional heat exchangers, micro heat exchangers reach coefficient of heat transmission values of 20,000 W/K m (both fluid passages 3' and 4':$d_i$=80 $\mu$m, $a_i$=70 $\mu$m). The specific heat transfer area can be greater than 100 $cm^2/cm^3$ compared with about 1 $cm^2/cm^3$ in conventional tube bundle heat exchangers. This results in an increase of the volume-specific heat transfer capacity by a factor of at least 100.

From the experimental data gathered during operation of such micro heat exchangers, residence times of the liquid in the heat exchangers down to a few milliseconds and heating and cooling rates of up to 1000° K per second can be achieved. As a result, a liquid flow of 400 kg/h can be heated or cooled in a micro heat exchanger with an active volume of 1 $cm^3$ at an entrance pressure of 6 bar and a discharge pressure of 1 bar in 3 milliseconds by 30° K. For a larger micro heat exchanger with 27 $CM^3$ active volume flow volumes of about 4000 kg/h can be achieved. The active volume of a micro heat exchanger is considered to be the volume in the interior of the heat exchanger, in which the microchannels are disposed. The volume of the cover and the side plates and the connections are not counted.

With the new method for destroying harmful bacteria, the liquid including the harmful microorganisms is, in a first step, rapidly heated in a micro heat exchanger 1 to a high temperature. Such a micro heat exchanger, as shown in FIG. 1, may have up to 10,000 microchannels per $cm^3$ active heat exchanger volume. The heating takes place in an extremely short period with a gradient of at least 200° K/sec. In a second step, the liquid is maintained at the high temperature for a period of <2 sec and, in a third step, the liquid is again cooled down in another micro heat exchanger again with a gradient of at least 200° K/sec. During the second step, heat may be added to the liquid in another micro heat exchanger in order to maintain the liquid at the high temperature. In a practical embodiment, the liquid is maintained for a period of about 0.2 to 0.3 sec at a temperature of between 140° and 200° C., In the same time of about 0.2 to 0.3 sec, the liquid is again cooled down.

In FIG. 2, the method is represented graphically in comparison with the state of the art showing the temperatures of the liquids in principle. The reference numeral 5 indicates the temperature of the liquid over time in comparison with the method of the prior art and the reference manual 6 indicates the temperature of the liquid over time with the new method using micro heat exchangers. Both curves 5 and 6 start out at an initial temperature of about 10° C. Of course, it is possible to start with higher preheat temperatures of up to about 80° C. as shown by the dashed line curves 13 and 14. Such pre-heat temperatures can be reached in a conventional manner or also by way of a micro-heat exchanger, which, as shown by curve 6, reaches such a preheat-temperature within millisecond or hundreds of a second. The curve 5 utilizing a state of the art heat exchanger shows a relatively slow temperature increase over several seconds during heating, a residence time 8 and a temperature reduction during cooling 9 again lasting several seconds. In contrast, the curve 6 shows the respective values for the new method providing for a very short heating time 10 of a few milli- or hundredths of a second, a residence time 11 of less than one second and a cool-down time 12 also in the millisecond or hundredths of a second range.

With the method according to the invention, the liquid can accordingly be rapidly heated and, again, rapidly cooled with the use of micro heat exchangers. The heating and cooling periods are only milliseconds or hundreds of a second. Since, for the high-temperature treatment of liquids for the destruction of microorganisms, the temperature can be increased if the effective treatment period is reduced, the liquid is rapidly increased to a temperature in the area of 200° C. with a short residence time at this temperature. If the liquid being treated is for example milk, the shelf life of the milk can be increased and, at the same time, the quality of the milk can be improved. For example, the taste of the milk is improved. The reason herefor is that with the high temperature reached, even though effective only for a very short period, the harmful microorganisms are completely destroyed but the food values are preserved.

The novel method is not limited to the treatment of certain liquids. Aside of the treatment of milk as already mentioned, it may be employed for the sterilization of other sensitive liquids, liquid foods such as juices, protein solutions, physiological solutions and others. It is also possible to use the method according to the invention for biological and pharmaceutical liquids for example for the destruction of viruses in blood plasma.

What is claimed is:

1. A method for destroying harmful microorganisms in a liquid by short-time high-temperature heating of the liquid in a micro heat exchanger having up to 10,000 microchannels per $cm^3$ active heat exchanger volume formed by stacks of metal foils having parallel microchannels formed in said metal foils, with the metal foils being joined by diffusion welding, said method comprising the steps of: in a first step, rapidly heating the liquid in a micro heat exchanger with a gradient of at least 200° K/sec, during a second step, maintaining the liquid at said high temperature for a time period of less than 2 seconds, and in a third step, cooling said liquid again in the micro heat exchanger with a gradient of at least 200° K/sec.

2. The method according to claim 1, wherein said second step also takes place in the micro heat exchanger in which heat is supplied to said liquid to maintain the high temperature of said liquid.

3. The method according to claim 1, wherein said liquid is heated within a time period of 0.2 to 0.3 second to a temperature of 140° C. to 200° C. and is cooled down again within the same time period of 0.2 to 0.3 second.

4. The method according to claim 1, wherein said liquid is liquid food including milk.

* * * * *